US007958989B2

(12) United States Patent
Bonnain

(10) Patent No.: US 7,958,989 B2
(45) Date of Patent: Jun. 14, 2011

(54) LUG CHAIN APPARATUS, A LUG FOR USE THEREIN AND A METHOD OF SECURING LUGS AT DESIRED LOCATIONS ALONG A MOVING ENDLESS CHAIN

(75) Inventor: Jean-Christophe Bonnain, Chateauroux (FR)

(73) Assignee: MeadWestvaco Packaging Systems, LLC, Richmond, VA (US)

( * ) Notice: Subject to any disclaimer, the term of this patent is extended or adjusted under 35 U.S.C. 154(b) by 82 days.

(21) Appl. No.: 12/295,174

(22) PCT Filed: Apr. 2, 2007

(86) PCT No.: PCT/US2007/065769
§ 371 (c)(1),
(2), (4) Date: Sep. 29, 2008

(87) PCT Pub. No.: WO2007/115252
PCT Pub. Date: Oct. 11, 2007

(65) Prior Publication Data
US 2009/0250319 A1 Oct. 8, 2009

(51) Int. Cl.
*B65G 15/44* (2006.01)
(52) U.S. Cl. ..................................... 198/731; 198/465.1
(58) Field of Classification Search .... 198/465.1–465.3, 198/731
See application file for complete search history.

(56) References Cited

U.S. PATENT DOCUMENTS

| 3,057,456 | A | * | 10/1962 | Heinzer | 198/465.1 |
| 3,666,076 | A | * | 5/1972 | Miller et al. | 198/345.3 |
| 3,949,859 | A | * | 4/1976 | Nussbaumer et al. | 198/345.3 |
| 4,088,220 | A | * | 5/1978 | Jacksch et al. | 198/803.2 |
| 4,461,216 | A | * | 7/1984 | Carney | 104/172.3 |
| 5,046,598 | A | * | 9/1991 | Colamussi | 198/465.1 |
| 5,165,523 | A | | 11/1992 | Wooley | |
| 5,220,996 | A | * | 6/1993 | Noestheden | 198/465.1 |
| 5,873,452 | A | * | 2/1999 | Nolan | 198/465.3 |
| 7,191,891 | B2 | * | 3/2007 | Hoveling | 198/345.3 |

FOREIGN PATENT DOCUMENTS

| DE | 11 50 021 | | 6/1963 |
| GB | 2436550 A | * | 10/2007 |
| WO | WO 99/65776 | | 12/1999 |

* cited by examiner

*Primary Examiner* — Mark A Deuble
(74) *Attorney, Agent, or Firm* — MWW Intellectual Property Group

(57) ABSTRACT

A lug chain apparatus having lugs (22), an endless chain (30) and a positioning mechanism (20). The lugs (22) are releasably engageable with the chain (30). The positioning wheel (20) engages the lugs (22) and moves them along the chain (30), to predetermined locations along the chain respectively. Each lug (22) includes locking mechanism (24, 26, 31) that holds that lug (22) in a predetermined location along the chain (30) when in a locking state, and allows movement of that lug (22) along said chain (30) when in a releasing state, such that repositioning of the lugs (22) along the chain (30) is effected without removal of the lugs (22) from the chain (30).

14 Claims, 4 Drawing Sheets

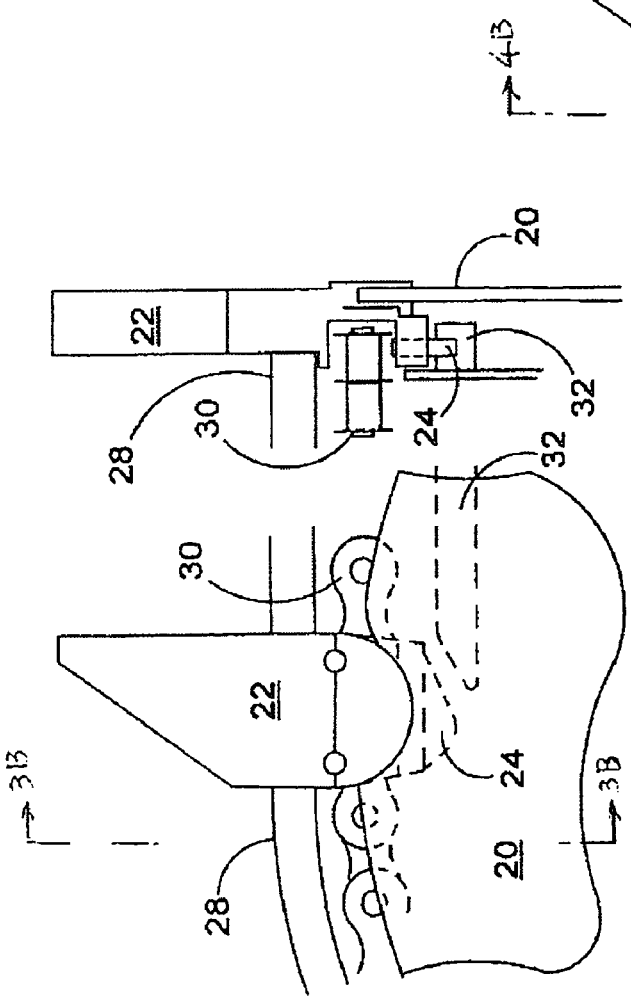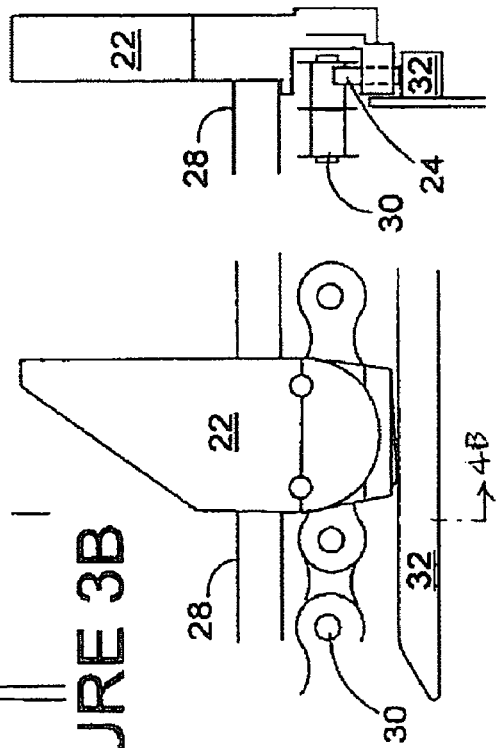

LUG CHAIN APPARATUS, A LUG FOR USE THEREIN AND A METHOD OF SECURING LUGS AT DESIRED LOCATIONS ALONG A MOVING ENDLESS CHAIN

FIELD OF INVENTION

The present invention relates generally to a lug chain apparatus with chain driven lugs, that are used widely in the packaging industry for tasks such as grouping or metering articles, and more specifically though not exclusively, to chain driven lugs that may be spaced with varying pitch along the length of a chain. Yet more specifically though not exclusively, the present invention relates to chain driven lugs adapted such that the aforementioned varying pitch may be achieved without altering the rotational speed of the chain.

BACKGROUND OF INVENTION

It is well known in the art that lugs, driven by chains, may be used for many purposes in industry such as, for example, grouping or metering articles as a part of a packaging process. Such articles may take differing sizes and may need to be grouped differently, depending on the requirement of the type of packaging used Therefore it is necessary to alter the spacing between successive lugs on the chain.

The prior art of such lug chains teaches lugs that are mounted upon a chain using some form of relatively easily releasable mechanism, which allows each lug to be removed, by hand, from the chain before being secured again to the chain at some other position. However, the prior art does not disclose a system whereby lugs may be releasably engaged with a chain, at desired points, whilst the system is in continuous operation.

Should the system require deactivation in order to reposition the lugs, it will necessarily lead to reduced efficiency of the system through increased 'down time'. It is therefore advantageous that the system be capable of altering the positions of the lugs whilst remaining operational.

The present invention therefore seeks to overcome or at lease minimize the disadvantages of the prior art by providing a system whereby the spacing between successive lugs on a chain may be altered without deactivating the system.

SUMMARY OF INVENTION

A first aspect of the present inventions provides a lug chain apparatus comprising lugs, chain and positioning means, wherein the lugs are positioned at predetermined locations along the chain, and wherein the positioning means engages the lugs and moves them along the chain, to said predetermined locations, and wherein each lug comprises locking means to hold that lug in one of said predetermined locations along the chain when that locking means is in a locked state, and to allow movement of that lug along said chain when the locking means is in a releasing state, such that repositioning of the lugs along the chain is effected without removal of the lugs from the chain.

Preferably the positioning means is operable to automate the movement of the lugs along the chain.

Preferably, the lug chain further comprises an engagement assembly that puts the locking means into said locking state.

Preferably, the lugs maintain a friction fit with the chain so that the lugs are driven by the chain when the locking means is in said releasing state, and wherein the friction fit is overcome if the lugs become impeded, so that the chain may slip beneath the lugs.

Preferably, the locking means is maintained in said locking state by the presence of an engaging assembly.

Preferably, the lug comprises a body, and wherein the locking means comprises a latch that is hinged to that body, which latch is releasably engageable with the chain.

Preferably, the lug chain comprises a reservoir of lugs, the locking means of each of those lugs being maintained in said releasing state, and wherein those lugs are held within a working reach of the positioning means such that each may be engaged, in turn, by the positioning means.

A second aspect of the present inventions provides a method of altering the spacing between lugs on a lug chain which method comprises the step of: providing multiple lugs upon a chain, which lugs are movable along the chain to predetermined locations, without requiring removal of the lugs from the chain; and providing positioning means to engage the lugs and move them along the chain to respective ones of said predetermined locations: and providing locking means to hold each lug in said respective ones of said predetermined locations when in a locking state, and to allow movement of that lug along the chain when in a releasing state; putting the locking means into said locking state when a lug reaches said respective one of said predetermined locations: and unlocking the locking means before returning the lugs to the positioning means.

Preferably, the method further comprises the step of maintaining a reservoir of lugs, the locking means of each of those lugs being maintained in said unlocking state, within a working reach of the positioning means such that each may be engaged, in turn, by the positioning means.

Preferably, the method further comprises the step of providing an engagement assembly that puts the locking means of each lug into said locking state.

BRIEF DESCRIPTION OF FIGURES

The drawings referred to throughout the description illustrate only one preferred embodiment of the invention; one skilled in the art will readily appreciate that other specific embodiments of a lug or lug chain apparatus may be used whilst still benefiting from the invention disclosed herein. In which drawings:

FIG. 3A is an enlarged fragmentary plan view of the lug chain apparatus of FIG. 1;

FIG. 3B is a view taken along the line 3B-3B in FIG. 3A;

FIG. 4A is an enlarged fragmentary plan view of the lug chain apparatus of FIG. 2;

FIG. 4B is a view taken along the line 4B-4B in FIG. 4A;

DETAILED DESCRIPTION

Figure 1:
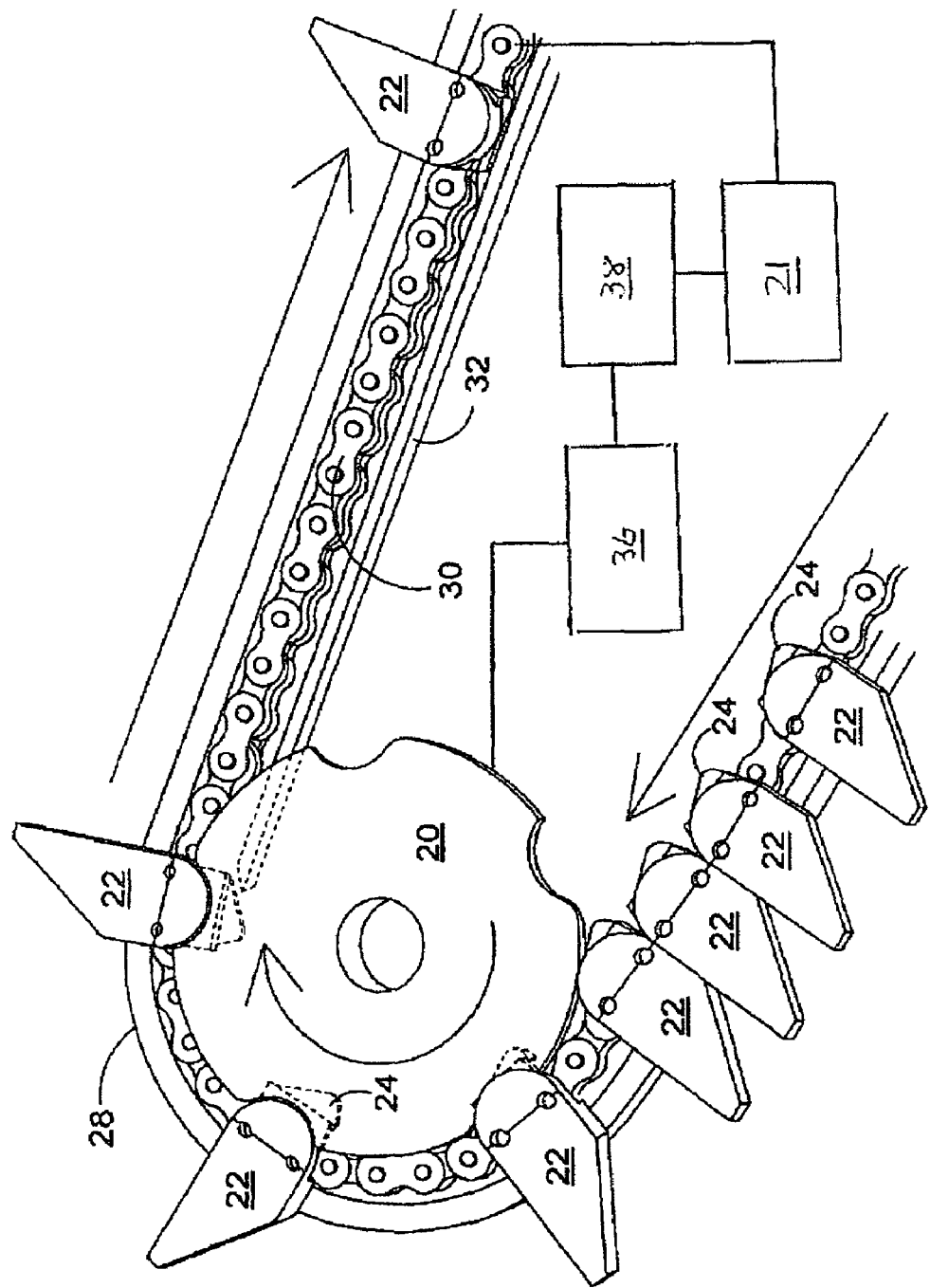
FIG. 1 is fragmentary perspective view of a lug chain assembly according to a preferred embodiment of the present invention, showing some lugs in engagement with and moved by a positioning wheel.

The present invention relates to a lug chain apparatus and a lug that is useful in the lug chain apparatus. FIG. 1 shows an exemplary embodiment of the lug chain apparatus using a plurality of lugs 22 such as those used in the grouping or metering of articles A. The lugs 22 are releasably engageable with an endless chain 30 that is driven by a suitable chain-driving means 21 including, for example, sprocket wheels and a driving motor for the sprocket wheels.

Figure 5:
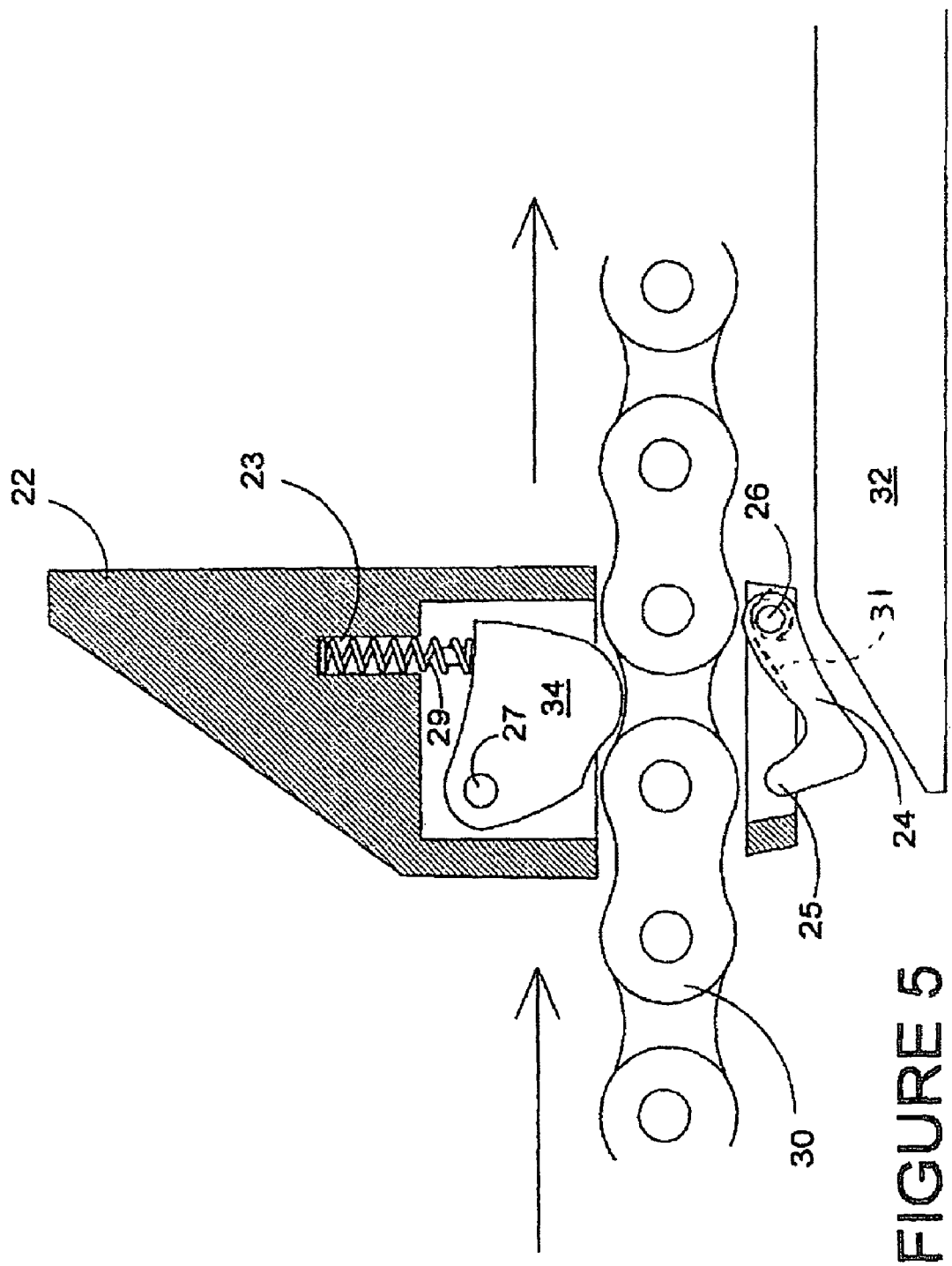
FIG. 5 is an enlarged cross sectional view of the lug of FIG. 3A and its surrounding portions.

Each lug 22 rests upon one side of the chain 30, and protruding portions of the lug 22 extend parallel to portions of the chain 30 adjacent said side, as illustrated in FIGS. 3B and 4B, thus defining a channel in which the chain 30 may be accommodated. The lug 22 does not form a tight fit with the chain 30, but rather permits the chain 30 to slide through a channel in the lug 22. A friction block 34, is disposed within each lug 22, as shown in FIG. 5. The friction block 34 is urged against a surface of the chain 30 and is formed from a high friction material. The friction block 34 is pivoted to the body of the lug 22, about a pivot point 27. Some form of resilient biasing means, such as a compression spring 29 held in a recess 23, urges the friction block 34 to pivot about pivot 27 thereby bringing a free end portion of the friction block 34 into contact with some portion of the chain 30. Preferably the pivot 27 is positioned sway from the centre of the friction block 34 and toward the side of the friction block 34 upstream of the motion of the chain 30. Thus, should the lug 22 encounter an encumbrance to its motion along the chain, the friction block 34 may more easily pivoted away from the chain 30 so as to allow the chain 30 to slide beneath it.

Clearly, other means of inducing a friction fit between the lug 22 and the chain are possible, the use of a pivoted friction block 34 being only one implementation, which other means of achieving such an affect are well known in the art.

A locking means or mechanism is provided for each lug 22. The locking means includes a latch 24 hinged at one of its ends to one end of the lug 22, about pivot 26. The opposing end of the latch 24 comprises a shaped portion 25 that protrudes toward the lug 22, and which is shaped so as to allow engagement with apertures occurring between links in the chain 30, as shown in FIG. 5. Thus, engaging the shaped portion 25 of the latch 24 with chain 30 secures the lug 22 in fixed relation to the chain 30.

In the lug chain apparatus of FIG. 1, a number of lugs 22 of the type described above, are located around a chain 30, which chain 30 is guided around a path a portion of which passes around the exterior of a star wheel 20 that provides a part of a positioning means or mechanism for positioning the lugs 22 at predetermined locations along the chain 30 respectively. The star wheel is not in contact with the chain 30, but is rather vertically offset from the surface of the chain 30, and the rotation of the chain is independent of the rotation of the star wheel 20.

The star wheel 20 comprises a number of indents around its perimeter, each indent being sized and shaped to be complementary to a portion of the lugs 22 protruding interior of the path of the chain 30. Thus it is possible for a lug 22 to sit upon the chain 30, whilst located in one of the indents in the perimeter of the star wheel 20. An outer guide 28 follows a path of constant offset from the exterior surface of the chain 30 and abuts a part of the aforementioned protruding portions of the lugs 22, so as to restrain the lug 22 from separating from the indent in the star wheel 20.

The indents in the star wheel 20 serve to trap the lugs 22 when the star wheel 20 is not rotating. When this happens, the chain 30, if rotating, slides through the aforementioned channel in the lugs 22 by overcoming the friction between the lug 22 and the chain 30. As the star wheel 20 turns, the combination of the rotational force of the star wheel 20 and that of the chain 30 serves to drives any lugs located in the aforementioned indents around the path of the guide 28.

The indents in the perimeter of the star wheel 20 are shaped such so as not to foul the path of the lugs 22 as the chain diverges away from the star wheel 20. The guide 28 continues to follow the chain 30 at a fixed offset, and therefore it too diverges from the perimeter of the star wheel 20, thus freeing the lug 22 to separate from the indent.

Figure 2:
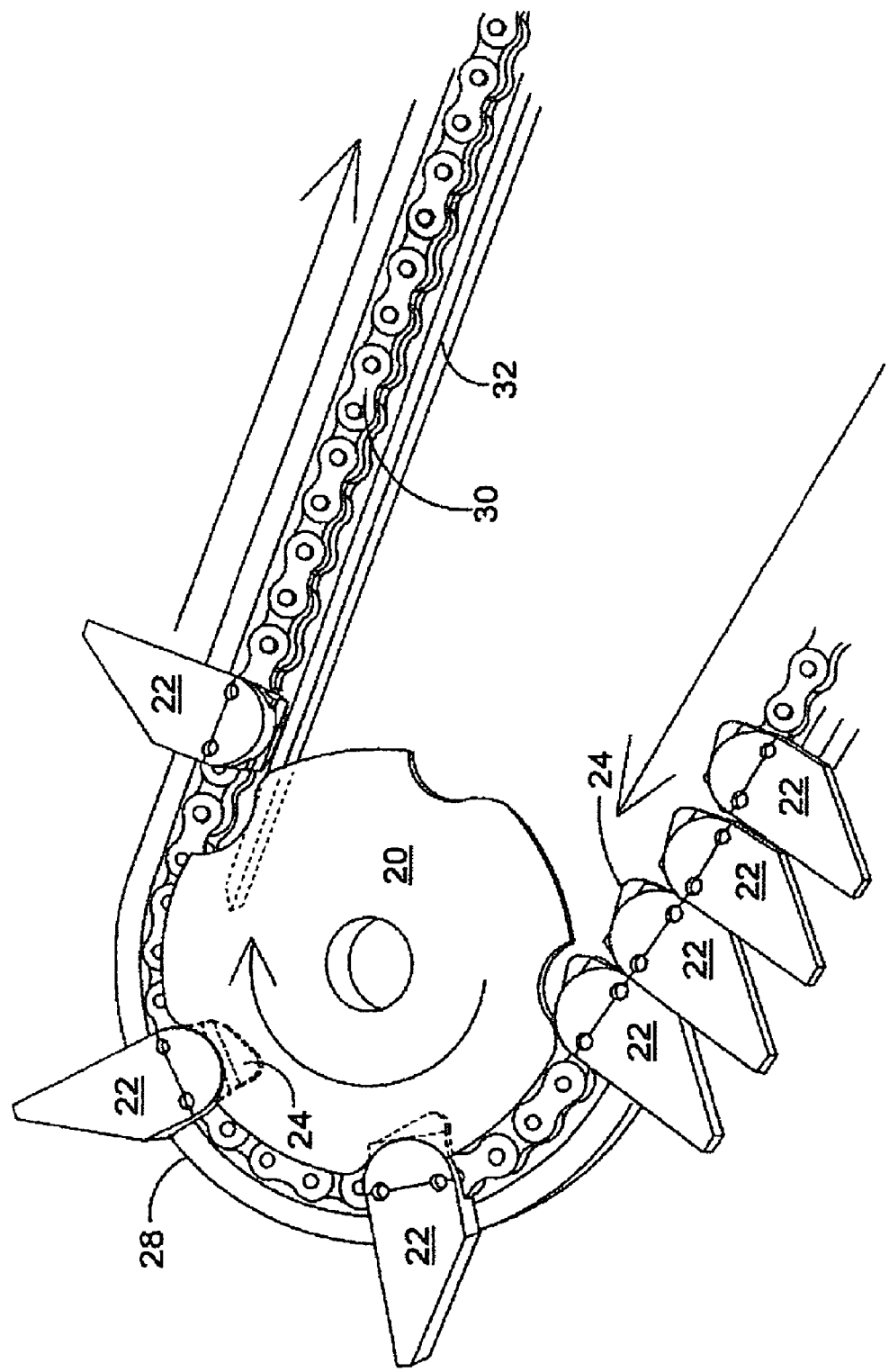
FIG. 2 is a fragmentary perspective view of the lug chain assembly of FIG. 1, showing one of the lugs moved apart from the positioning wheel.

FIGS. 1, 3A and 3B specifically illustrate the point in the process before the aforementioned separation begins to occur. The latch 24 is preferably hinged to the body of the lug 22 toward its leading edge. FIGS. 2, 3A and 3B show how an activating assembly in the form of a runner 32 having a tapered end may be arranged so as to come into contact with the latch 24 before the lug becomes separated from the star wheel 20. As the latch 24 comes into slicing contact with the tapered edge of the runner 32, the latch 24 is activated or pivoted up into engagement with the chain 30, thus securing the lug 22 onto the chain 30.

The latch 24 is preferably resiliency biased away from the chain 30 by means, for example, of a spiral spring 31 disposed around the pivot 26, so as to resist the hinging of the latch 24 into a position of engagement with the chain 30 For this reason, if is necessary that the latch 24 be brought into a position of engagement before separation of the lug 22 from the star wheel 20 is complete, so that sufficient driving force from the star wheel remains acting upon the lug to overcome the resistance of the resilient bias.

Once the latch 24 has bean entered into a position of engagement with the chain 30, the force of the resilient bias encourages the latch 24 to hinge away from the chain 30 and therefore disengage the lug 22 from the chain 30, as shown in FIGS. 2, 4A and 4B. This disengagement is prevented by the fixed offset between the runner 32 and the guide 28. The guide 23 maintains a sliding contact with parts of the protruding portions of the lug 22 whilst the runner 32 maintains a sliding contact with parts of the latch 24, thus combining to prevent the latch 24 from hinging away from the lug 22. The lug is consequentially sandwiched between the runner 32 and the guide 28, and is driven along the length of the two by the chain 30 to which it is secured.

Thus, the lugs 22, once secured, are ready to perform operations well known in the art such as grouping articles. Most chain driven systems employ art endless chain, and therefore at some point the lugs 22 will return to the star wheel 20. Before this occurs, the runner 32 terminates so as to allow the lugs 22 to disengage from the chain 30. Friction between the friction block 25 and the chain 30 suffices to drive the lugs 22 around the remainder of the path of the chain, and back to the star wheel 20.

Once the disengaged lugs 22 reach the start wheel 20, they will be impeded by either the surface of the star wheel 20 or another lug 22, at this point the chain 30 will overcome the friction of the friction block 25 and the lug 22 and will begin to slip beneath the lug 22. Therefore it is possible for the lugs 22 to queue, with the chain 30 passing beneath them, until such time as the star wheel 20 is positioned so as to align an indent in its perimeter with a lug 22 at the head of the queue. Friction between the lug 22 and the chain 30 exerts sufficient force on the lug 22 to locate it in the indent, and thereafter above process begins again.

Beside the star wheel 20, the positioning means further includes a wheel-driving means 36 (e.g., a servomotor) and an electronic control means 33 (see FIG. 1). The star wheel 20 is rotated by the wheel-driving means 38 independently of the rotation of the chain 30. The wheel-driving means 36 is controlled by the control means 38 to adjust the rotational speed of the star wheel 20 relative to the rotational speed of the chain 30. The control means 38 monitors the rotational speed of the chain 30 through the chain-driving means 21 and use the monitored rotational speed of the chain 30 to adjust the rotational speed of the star wheel 20 and/or to control the chain-driving means 21 itself to adjust the rotational speed of the chain 30. By this means, the positioning means is capable of controlling at exactly which point along the chain 30 the lug 22 is secured, and thus allowing varying separation distances (i.e., the pitch) between successive lugs. The rotational speed of the star wheel 20 relative to that of the chain 30 dictates the change in pitch between the lugs 22. If the star wheel 20 is controlled to rotate faster than the chain 30, the pitch will reduce, whilst if the star wheel is controlled to rotate slower than the chain 30, the pitch will increase. During the normal operation of the lug chain apparatus, the control means 38 also controls the rotation of the star wheel 20 so as to ensure that the protruding portion 25 of the latch 24 is always located into a link in the chain 30.

As the desired spacing between the lugs 22 on the chain 30 increases, the total number of lugs 22 which may be located on the chain 30 at any one time will decrease. The aforementioned queuing of lugs 22 enables surplus lugs 22 to wait until they are required, without any need for user intervention or for deactivation of the chain in order to remove them.

The above description relates to a preferred embodiment of a lug 22 and a lug chain apparatus into which it is incorporated. It is, however, contemplated that other embodiments of the lug or the lug chain apparatus may be employed without departing from the scope of the present invention, in particular, the way in which a friction fit is achieved between the lugs 22 and the chain 30 may be achieved in any way known in the art. Moreover, the present invention is not limited to strictly chain driven systems, and may well be employed on belt driven systems also. The particularities of the latch herein described may also be altered so as to suit the chain or belt being used.

What is claimed is:

1. A lug chain apparatus comprising an endless chain, chain-driving means for rotating the chain, lugs releasably engageable with the chain and positioning means for engaging the lugs and moving the lugs respectively to predetermined locations along the chain, wherein each of said lugs comprises a moveable locking means to hold said each lug in a respective one of said predetermined locations when said moveable locking means of said each lug is in a locking state and to allow movement of that lug along and in sliding contact with said chain when the moveable locking means is in a releasing state and wherein said lugs maintain a friction fit with the chain so that the lugs are driven by the chain when the moveable locking means is in said releasing state, and wherein the friction fit is overcome if the lugs become impeded, so that the chain may slip beneath the lugs and wherein each lug comprises a pivotal friction pad that hinges relative to the lug and which is urged against the chain, when that lug is positioned on the chain, by a resilient biasing member.

2. A lug chain apparatus as claimed in claim 1 wherein the positioning means is operable to automate movement of the lugs along the chain.

3. A lug chain apparatus as claimed in claim 1 further comprising an activating means for moving the moveable locking means into said locking state.

4. A lug chain apparatus as claimed in claim 3 wherein said activating means is a static guide that abuts the moveable locking means, thereby causing said moveable locking means to move into said locking state, which static guide terminates proximate said positioning means.

5. A lug chain as claimed in claim 4, wherein said static guide has a tapered leading edge for facilitating movement of said moveable locking means.

6. A lug chain apparatus as claimed in claim 1 wherein the locking means is maintained in said locking state by activating means for putting the locking means into said locking state.

7. A lug chain apparatus as claimed in claim 1 wherein the lug comprises a body, and wherein the moveable locking means comprises a latch that is hinged to that body, which latch is releasably engageable with the chain.

8. A lug chain apparatus as claimed in claim 1 further comprising a reservoir of lugs, the moveable locking means of each of the lugs of said reservoir being maintained in said releasing state, and wherein each of the lugs of said reservoir is held within a working reach of the positioning means such that each may be engaged, in turn, by the positioning means.

9. A lug chain apparatus as claimed in claim 1 wherein said positioning means comprises a rotational engaging wheel having at least one indent along a perimeter thereof for engaging the lugs and further comprising wheel-driving means for rotating said engaging wheel and control means for controlling said wheel-driving means to adjust the rotational speed of said engaging wheel relative to the rotational speed of said chain, whereby said positioning means dictates change in pitch between said lugs.

10. A lug chain apparatus as claimed in claim 1, wherein said moveable locking means is resiliently biased relative to said lug by a resiliently biasing member.

11. A method for repositioning lugs at desired locations along a moving endless chain, said method comprising the steps of: placing multiple lugs upon a moving endless chain such that said lugs are releasably engageable with the chain, each lug comprising a moveable locking means; moving the moveable locking means of said lugs into a releasing state; moving the lugs along the chain, in sliding contact therewith, to predetermined locations on the chain respectively; and moving the moveable locking means of those lugs into a locking state, one at a time and successively, in said predetermined locations respectively to allow said lugs to be driven by the chain and wherein said lugs maintain a friction fit with the chain so that the lugs are driven by the chain when the moveable locking means is in said releasing state, and wherein the friction fit is overcome if the lugs become impeded, so that the chain may slip beneath the lugs and wherein each lug comprises a pivotal friction pad that hinges relative to the lug and which is urged against the chain, when that lug is positioned on the chain by a resilient biasing member.

12. A method as claimed in claim 11 wherein said moving step comprises controlling the speed of said lugs relative to the speed of the moving chain and thereby controlling the pitch between said lugs.

13. A lug for use in a lug chain apparatus, said lug being releasably engageable with a chain, wherein said lug comprises a moveable locking means for locking said lug in a predetermined location along the chain when said locking means is in a locking state and for releasing said lug from said chain when said locking means is in a releasing state, in which state the lug can be moved along, and in sliding contact with, the chain and wherein said lugs maintain a friction fit with the chain so that the lugs are driven by the chain when the moveable locking means is in said releasing state, and wherein the friction fit is overcome if the lugs become impeded, so that the chain may slip beneath the lugs and wherein each lug comprises a pivotal friction pad that hinges relative to the lug and which is urged against the chain, when that lug is positioned on the chain, by a resilient biasing member.

14. A lug as claimed in claim 13 further comprising a body, and wherein said moveable locking means comprises a latch that is hinged to that body, which latch is releasably engageable with the chain.

* * * * *